(12) United States Patent
Park et al.

(10) Patent No.: US 10,176,939 B2
(45) Date of Patent: Jan. 8, 2019

(54) HIGH-VOLTAGE DC CIRCUIT BREAKER FOR BLOCKING CURRENT FLOWING THROUGH DC LINES

(71) Applicant: HYOSUNG HEAVY INDUSTRIES CORPORATION, Seoul (KR)

(72) Inventors: Jung-Soo Park, Seongnam-si (KR); Se-Hee Han, Seoul (KR); Hui-Dong Hwang, Changwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 161 days.

(21) Appl. No.: 15/109,056

(22) PCT Filed: Dec. 24, 2014

(86) PCT No.: PCT/KR2014/012866
§ 371 (c)(1),
(2) Date: Jun. 29, 2016

(87) PCT Pub. No.: WO2015/102311
PCT Pub. Date: Jul. 9, 2015

(65) Prior Publication Data
US 2016/0322178 A1 Nov. 3, 2016

(30) Foreign Application Priority Data
Dec. 31, 2013 (KR) .......................... 10-2013-0168327

(51) Int. Cl.
*H01H 9/30* (2006.01)
*H02H 3/087* (2006.01)
(Continued)

(52) U.S. Cl.
CPC .............. *H01H 9/30* (2013.01); *H01H 9/542* (2013.01); *H01H 33/596* (2013.01);
(Continued)

(58) Field of Classification Search
CPC ....... H01H 2009/543; H01H 2009/544; H01H 33/596; H01H 9/30; H01H 9/542;
(Continued)

(56) References Cited

U.S. PATENT DOCUMENTS 4,168,905 A * 9/1979 Kitajima .............. G03G 15/041
355/60
4,578,730 A * 3/1986 Tokuyama ........... H01H 33/596
307/126
(Continued)

FOREIGN PATENT DOCUMENTS

DE 3734989 A1 * 4/1988 ........... H01H 33/596
EP 0272349 A1 6/1988
(Continued)

*Primary Examiner* — Thienvu Tran
*Assistant Examiner* — Nicholas Bellido
(74) *Attorney, Agent, or Firm* — Novick, Kim & Lee, PLLC; Jae Youn Kim

(57) ABSTRACT

Provided is a high-voltage direct current (DC) circuit breaker which interrupts a fault current flowing in a power transmission or power distribution DC line when a fault occurs in the DC line. The high-voltage DC circuit breaker includes: a main switch, installed in the DC line, for interrupting a current in the DC line by being opened when a fault occurs in one side or the other side of the DC line; a nonlinear resistor, connected in parallel to the main switch, for consuming overvoltage; and an LC circuit connected in parallel to the main switch and comprising a capacitor and an inductor that are connected to each other in series to generate LC resonance.

3 Claims, 5 Drawing Sheets

(51) Int. Cl.
*H01H 33/59* (2006.01)
*H01H 9/54* (2006.01)

(52) U.S. Cl.
CPC .............. *H02H 3/087* (2013.01); *H01H 9/547* (2013.01); *H01H 2009/543* (2013.01); *H01H 2009/544* (2013.01)

(58) Field of Classification Search
CPC ........ H01H 9/547; H01H 33/18; H01H 33/56; H01H 33/59; H01H 33/593; H01H 33/66; H01H 33/664; H01H 9/446; H02H 3/021; H02H 3/087; H02H 3/16
USPC ........................................................... 361/2
See application file for complete search history.

(56) References Cited

U.S. PATENT DOCUMENTS

| | | | | |
|---|---|---|---|---|
| 4,805,062 A | * | 2/1989 | Shirouzu | H01H 33/596 361/13 |
| 5,214,557 A | * | 5/1993 | Hasegawa | H01H 33/596 361/11 |
| 5,452,170 A | * | 9/1995 | Ohde | H01H 33/596 174/DIG. 17 |
| 2013/0020881 A1 | * | 1/2013 | Panousis | H01H 33/596 307/113 |
| 2016/0204595 A1 | * | 7/2016 | Park | H02H 3/087 361/10 |
| 2016/0322177 A1 | * | 11/2016 | Hwang | H02H 3/087 |
| 2016/0322179 A1 | * | 11/2016 | Hwang | H01H 33/18 |
| 2016/0329179 A1 | * | 11/2016 | Kim | H01H 33/596 |
| 2017/0352508 A1 | * | 12/2017 | Chung | H01H 33/59 |
| 2018/0174784 A1 | * | 6/2018 | Kim | H01H 33/02 |

FOREIGN PATENT DOCUMENTS

| | | |
|---|---|---|
| JP | 59-068128 A | 4/1984 |
| JP | 2679997 B2 | 11/1997 |
| JP | 4131769 B2 | 8/2008 |
| JP | 2009-181908 A | 8/2009 |

* cited by examiner

HIGH-VOLTAGE DC CIRCUIT BREAKER FOR BLOCKING CURRENT FLOWING THROUGH DC LINES

TECHNICAL FIELD

The present invention generally relates to a high-voltage Direct Current (DC) circuit breaker and, more particularly, to a high-voltage DC circuit breaker, which is configured to, when a fault occurs on one side of a DC line for power transmission or power distribution, block a fault current flowing through the DC line.

BACKGROUND ART

Generally, a high-voltage DC circuit breaker is a switching device capable of blocking current flowing through a high-voltage power transmission line of about 50 kV or more, such as that for a High Voltage Direct Current (HVDC) system. Such a high-voltage DC circuit breaker functions to block a fault current when a fault occurs in a DC line. Of course, such a high-voltage DC circuit breaker may also be applied to an intermediate voltage DC power distribution system having a DC voltage level of about 1 to 50 kV.

In the case of a high-voltage DC circuit breaker, when a fault current occurs in the system, the fault current is blocked in such a way as to isolate a faulty circuit by opening a main switch. However, since a point corresponding to zero (0) current is not present in the DC line, a problem arises in that an arc occurring between the terminals of the main switch is not extinguished when the main switch is opened, and the fault current continuously flows through the arc, thus making it impossible to block the fault current.

Japanese Patent Application Publication No. 1984-068128, shown in FIG. 1, discloses technology in which a high-voltage DC circuit breaker allows a main switch CB to generate zero (0) current by adding current $I_{DC}$ flowing through the main switch CB to resonant current Ip generated by an LC circuit ($Idc=I_{DC}+Ip$) and extinguish the arc in order to extinguish the arc occurring when the switch operation of the main switch CB is performed and to block fault current Ic. That is, when the main switch CB is closed, the resonant current Ip is injected to be added to the DC current $I_{DC}$, and thereafter the resonant current Ip becomes oscillating current due to LC resonance. As the current oscillates along with the main switch CB, the magnitude thereof becomes larger. In this way, negative (−) resonant current (−Ip) becomes greater than $I_{DC}$, so that the fault current Ic becomes zero current, and then the arc in the main switch CB is extinguished. However, in such conventional technology, resonant current Ip greater than DC current $I_{DC}$ must be added, and thus the actual circuit rating must be more than twice that of the rated current. As a result, a problem arises in that, to generate such a high resonant current Ip, resonance must be performed several times, thus decreasing the blocking speed.

DISCLOSURE

Technical Problem

The present invention has been made keeping in mind the above problems, and an object of the present invention is to provide a high-voltage DC circuit breaker, which can completely block a fault current occurring in a main switch by generating a current pulse using a voltage stored in the capacitor of an LC resonance circuit even if a resonant current is not applied to the main switch in the high-voltage DC circuit breaker.

Another object of the present invention is to provide a high-voltage DC circuit breaker, which can improve blocking speed by allowing a main switch to completely block a fault current using a current pulse.

A further object of the present invention is to provide a high-voltage DC circuit breaker, which can perform a reclosing operation through a main switch.

Technical Solution

A high-voltage DC circuit breaker according to the present invention is a higher-voltage DC circuit breaker for blocking current flowing through a DC line, and includes a main switch connected to the DC line, and configured to be opened when a fault occurs on a first side or a second side of the DC line, thus blocking a current flowing through the DC line; an LC circuit connected in parallel with the main switch and provided with a capacitor and an inductor connected in series with each other to produce LC resonance; a first switching element connected in parallel with the LC circuit and configured to perform switching so that a positive voltage (+Vc) or a negative voltage (−Vc) stored in the capacitor via resonance produced by the LC circuit is charged, with a polarity of the positive or the negative voltage changed; and a second switching element connected in series with the LC circuit and connected between the LC circuit and the DC line, the second switching element performing switching so that a current pulse, generated by the voltage (+Vc) or (−Vc) charged in the capacitor, is supplied to the main switch.

In the high-voltage DC circuit breaker according to the present invention, the first switching element and the second switching element may be connected in a forward direction, may be each arranged in a forward or reverse direction relative to a direction of current flowing from the second side to the first side of the DC line, and may be each implemented using one or more power semiconductor switches.

The high-voltage DC circuit breaker according to the present invention may further include a charging resistor for charging a voltage (+Vc) in the capacitor during an initial operation, wherein the charging resistor is connected between the capacitor of the LC circuit and a ground so that the charging resistor is arranged in series with the LC circuit.

In the high-voltage DC circuit breaker according to the present invention, when the main switch is opened due to occurrence of a fault on the first side of the DC line, and an arc is formed when the main switch is opened, the first switching element may be turned on in a state in which the second switching element is turned off, so that a voltage (−Vc) is charged in the capacitor via LC resonance between the inductor and the capacitor of the LC circuit, and thereafter, the first switching element may be turned off and the second switching element may be turned on, so that a current pulse generated by the voltage (−Vc) charged in the capacitor is supplied in a direction of a first end of the main switch, and zero (0) current is realized in the main switch using the supplied current pulse, thus enabling the arc formed in the main switch to be extinguished.

The high-voltage DC circuit breaker according to the present invention may further include a nonlinear resistor connected in parallel with the main switch, wherein, after the arc formed in the main switch has been extinguished, overvoltage on the second side, which becomes higher than a voltage on the first side of the DC line, is consumed in the nonlinear resistor while the capacitor is recharged to a voltage (+Vc) using current flowing through the LC circuit, and then the second switching element is turned off.

In the high-voltage DC circuit breaker according to the present invention, when the main switch is opened due to occurrence of a fault on the second side of the DC line, and an arc is formed when the main switch is opened, the second switching element may be turned on in a state in which the first switching element is turned off, so that a current pulse generated by a voltage (+Vc) stored in the capacitor of the LC circuit is supplied in a direction of a second end of the main switch, and zero (0) current is realized in the main switch using the supplied current pulse, thus enabling the arc formed in the main switch to be extinguished, and enabling a voltage (-Vc) to be charged in the capacitor.

The high-voltage DC circuit breaker may further include a nonlinear resistor connected in parallel with the main switch, wherein, after the arc formed in the main switch has been extinguished, overvoltage on the first side of the DC line, which becomes higher than a voltage on the second side of the DC line, is consumed in the nonlinear resistor while the voltage (-Vc) charged in the capacitor is charged as the voltage (+Vc) via resonance produced by the LC circuit when the first switching element is turned on in a state in which the second switching element is turned off, and thereafter the first switching element is turned off.

Advantageous Effects

The high voltage DC circuit breaker according to the present invention is advantageous in that it can completely block a fault current occurring in a main switch by generating a current pulse using a voltage stored in the capacitor of an LC resonance circuit even if a resonant current is not applied to the main switch in the high-voltage DC circuit breaker, and is also advantageous in that it can improve blocking speed by allowing the main switch to completely block a fault current using a current pulse. Further, the present invention is advantageous in that it can perform a reclosing operation through the main switch.

BEST MODE

Preferred embodiments of the present invention will be described in detail below with reference to the accompanying drawings. Descriptions of known functions or configurations which have been deemed to make the gist of the present invention unnecessarily obscure will be omitted below.

Figure 2:
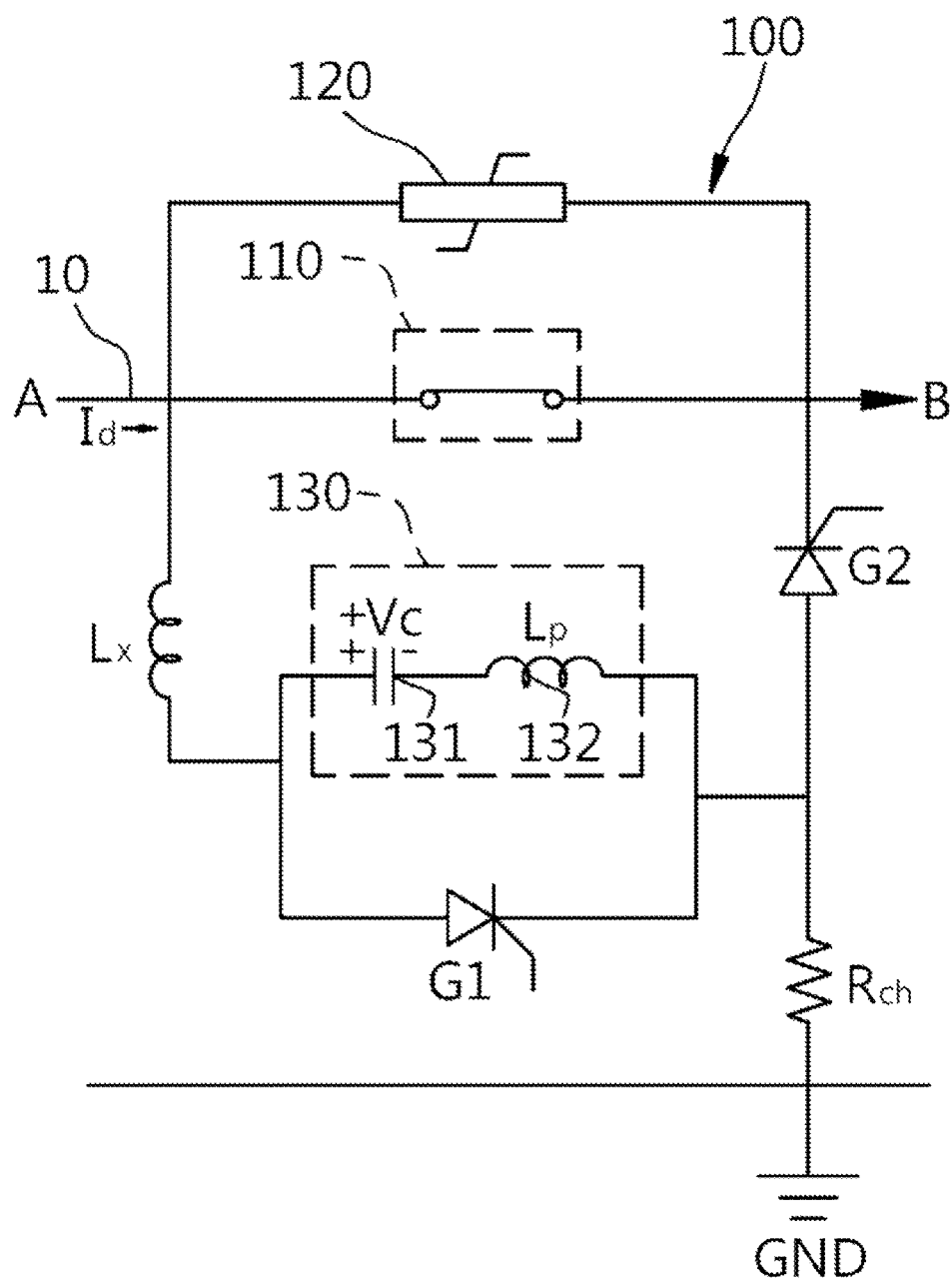
FIG. 2 is a circuit diagram showing the configuration of a high-voltage DC circuit breaker according to an embodiment of the present invention.

FIG. 2 is a circuit diagram showing the configuration of a high-voltage DC circuit breaker according to an embodiment of the present invention.

Referring to FIG. 2, a high-voltage DC circuit breaker 100 according to an embodiment of the present invention includes a main switch 110 connected to a DC line 10 for connecting side A and side B. The high-voltage DC circuit breaker 100 according to the present invention will be described below on the assumption that current Idc flows in the direction from side A to side B by way of example. Of course, current may flow in the direction from side B to side A in another example.

The main switch 110 of the high-voltage DC circuit breaker 100 functions to block the DC line 10 in order to prevent a fault current from continuously flowing into a faulty circuit when a fault occurs on the first side of the DC line 10, that is, on side B. For this, the main switch 110 is maintained in a closed state, in a normal condition (steady state), as shown in FIG. 2, and is opened upon the occurrence of a fault, as shown in FIGS. 3(a) and (b). The switching operation of the main switch 110 is controlled in response to a control signal from a control unit (not shown).

In the present embodiment, a nonlinear resistor 120 is connected in parallel with the main switch 110 and is configured to prevent overvoltage equal to or greater than a rated voltage from being applied across the two ends of the high-voltage DC circuit breaker 100 when the main switch 110 is closed. The nonlinear resistor 120 is operated such that, when overvoltage attributable to a fault, that is, a voltage equal to or greater than a preset reference voltage, is applied across the two ends of the high-voltage DC circuit breaker 100, the nonlinear resistor 120 is automatically turned on, thus consuming the overvoltage. In the present embodiment, the nonlinear resistor 120 is implemented as, for example, a varistor.

In the embodiment of the present invention, when a high voltage is applied to the DC line 10, a high current flows through the main switch 110. Due thereto, when a fault occurs and the main switch 110 is opened, an arc is formed across the switching terminals of the main switch 110, and a DC fault current continuously flows through the DC line 10 via the arc. Therefore, the high-voltage DC circuit breaker 100 according to the embodiment of the present invention is configured to include an LC circuit 130, a first switching element G1, and a second switching element G2 in addition to the main switch 110 and the nonlinear resistor 120 in order to extinguish the arc and completely block the fault current.

The LC circuit 130 is connected in parallel with the main switch 110 and includes a capacitor 131 and an inductor 132, which are connected in series with each other, so as to produce LC resonance. The Lp of the inductor 132 shown in FIG. 2 denotes an inductance value. For the LC circuit 130, the first switching element G1 and the second switching element G2 are connected in a forward direction, and are configured such that, when current Id flows in the direction from side A to side B along the high voltage DC line 10, respective anodes (to which no reference numeral is assigned) or respective cathodes (to which no reference numeral is assigned) of the first switching element G1 and the second switching element G2 are arranged in the same forward direction as the direction of flow of the current Id, wherein each of the switching elements is implemented using one or more power semiconductor switches. One power semiconductor switch may be implemented as a thyristor, a Gate Turn-Off (GTO) thyristor, an Integrated Gate-Commutated Thyristor (IGCT), or an Insulated Gate Bipolar Transistor (IGBT), and the second switching element G2 may be implemented as a diode.

The arrangement of the first switching element G1 and the second switching element G2 in the forward direction means that, when the high-voltage DC circuit breaker 100 according to the embodiment of the present invention is initially operated or when a steady state current Id flows in the direction from side A to side B along the DC line 10, the anodes and cathodes are arranged in the forward direction relative to the direction of flow of the current Id.

The first switching element G1, arranged in the forward direction, is connected in parallel with the LC circuit 130 and is configured to perform switching so that a positive voltage (+Vc) charged in the capacitor 131 is changed to a negative voltage (−Vc), or the voltage (−Vc) is changed to the voltage (+Vc), via resonance produced by the LC circuit 130. That is, the first switching element G1 performs switching so that, when it is turned off, voltage is charged in the capacitor 131 using the voltage of the DC line 10, and so that, when it is turned on, a closed circuit with the LC circuit 130 is formed, and thus the positive voltage (+Vc) or the negative voltage (−Vc), stored in the capacitor 131, is charged, with the polarity of the voltage being changed, via the resonance provided by the LC circuit 130.

The second switching element G2 is connected to the inductor 132 of the LC circuit 130 and to the DC line so that it is connected in series with the LC circuit 130, and is configured to perform switching so that a current pulse generated using the voltage (−Vc) or (+Vc) charged in the capacitor 131 is supplied to the main switch 110.

The high-voltage DC circuit breaker 100 according to the embodiment of the present invention further includes a charging resistor Rch for charging the voltage (+Vc) in the capacitor 131 during an initial operation.

The charging resistor Rch is connected between the capacitor 131 of the LC circuit 130 and a ground GND so as to be arranged in series with the LC circuit 130. That is, the charging resistor Rch is connected between the junction of the LC circuit 130 and the second switching element G2 and the ground GND, and is configured such that, when current Idc normally flows through the main switch 110 during the initial operation of the high-voltage DC circuit breaker 100 according to the present invention, voltage +Vc is charged in the capacitor 131 when a DC voltage is applied to the DC line 10.

The operation of the high-voltage DC circuit breaker 100 according to the embodiment of the present invention, having the above configuration, will be described in detail with reference to FIG. 3.

Figure 3:
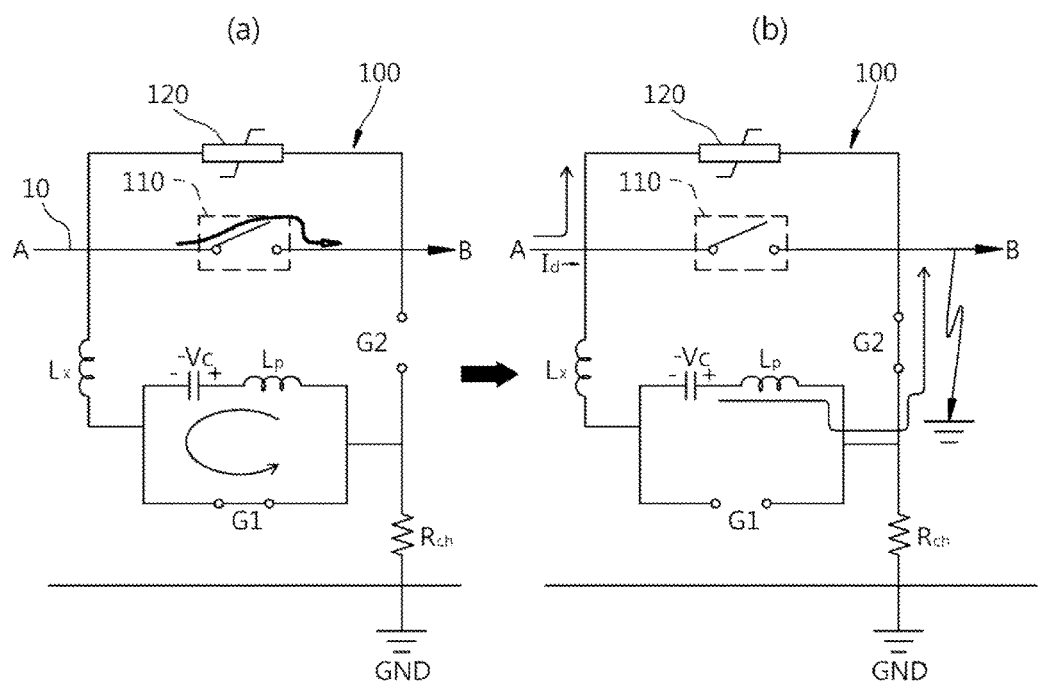
FIGS. 3(a) and 3(b) show equivalent circuit diagrams of first and second switching elements to illustrate the operating procedure of the high-voltage DC circuit breaker when a fault occurs on a first side of the high-voltage DC line shown in FIG. 2.

FIG. 3 is an equivalent circuit diagram of the first and second switching elements to describe the operating procedure of the high-voltage DC circuit breaker when a fault occurs on the first side of the high voltage DC line shown in FIG. 2.

In the high-voltage DC circuit breaker 100 according to the embodiment of the present invention, the main switch 110 is closed in a steady state, in which current Id normally flows through the DC line 10. Further, both the first switching element G1 and the second switching element G2 are turned off and are maintained in a cutoff state. Accordingly, when voltage is applied to the DC line 10, the steady state current Id flows through the main switch 110 along the DC line 10, and a DC voltage (+Vc) is charged in the capacitor 131 through the capacitor 131 and the inductor 132 of the LC circuit 130 and the charging resistor Rch.

If a fault occurs on the first side (side B) of the DC line 10, the control unit (not shown) detects the occurrence of the fault using well-known technology and opens the main switch 110, as shown in FIG. 3. When the main switch 110 is opened, an arc is formed across the switching terminals of the main switch 110, and thus a fault current continuously flows from side A to side B.

When the main switch 110 is opened due to the occurrence of a fault on side B of the DC line 10, and an arc is formed upon the opening of the main switch 110, the first switching element G1 is turned on in the state in which the second switching element G2 is turned off, as shown in FIG. 3(a). When the first switching element G1 is turned on, the first switching element G1 and the LC circuit 130 form a closed circuit, so that the voltage (+Vc) charged in the capacitor 131 is charged as −Vc depending on LC resonance between the inductor 132 and the capacitor 131 of the LC circuit 130, and thereafter the first switching element G1 is turned off.

When the first switching element G1 is turned off, the second switching element G2 is turned on, as shown in FIG. 3(b), and a current pulse generated by the voltage (−Vc) charged in the capacitor 131 is supplied to the main switch 110 in the direction of the first end of the main switch 110, and zero (0) current is realized in the main switch 110 using the supplied current pulse, thus enabling the arc formed in the main switch 110 to be extinguished.

After the arc formed in the main switch 110 has been extinguished, overvoltage generated on the second side (side A), which becomes higher than the voltage on the first side (side B) of the DC line 10, is consumed in the nonlinear resistor 120, as shown in FIG. 3(b), at the same time that the capacitor 131 is recharged to the voltage (+Vc) using the current flowing through the LC circuit 130 due to the OFF operation of the first switching element G1, and then the second switching element G2 is turned off.

When the second switching element G2 is turned off, the high-voltage DC circuit breaker 100 according to the present invention performs an operation of reclosing the main switch 110. That is, when a closed circuit is formed by closing the main switch 110, the above-described procedures are repeated to block the fault current until the fault on the side B is repaired. Such reclosing is performed because the capacitor 131 of the LC circuit 130 is maintained in a state of being charged to the voltage (+Vc) after the arc has been extinguished at the main switch 110.

Figure 4:
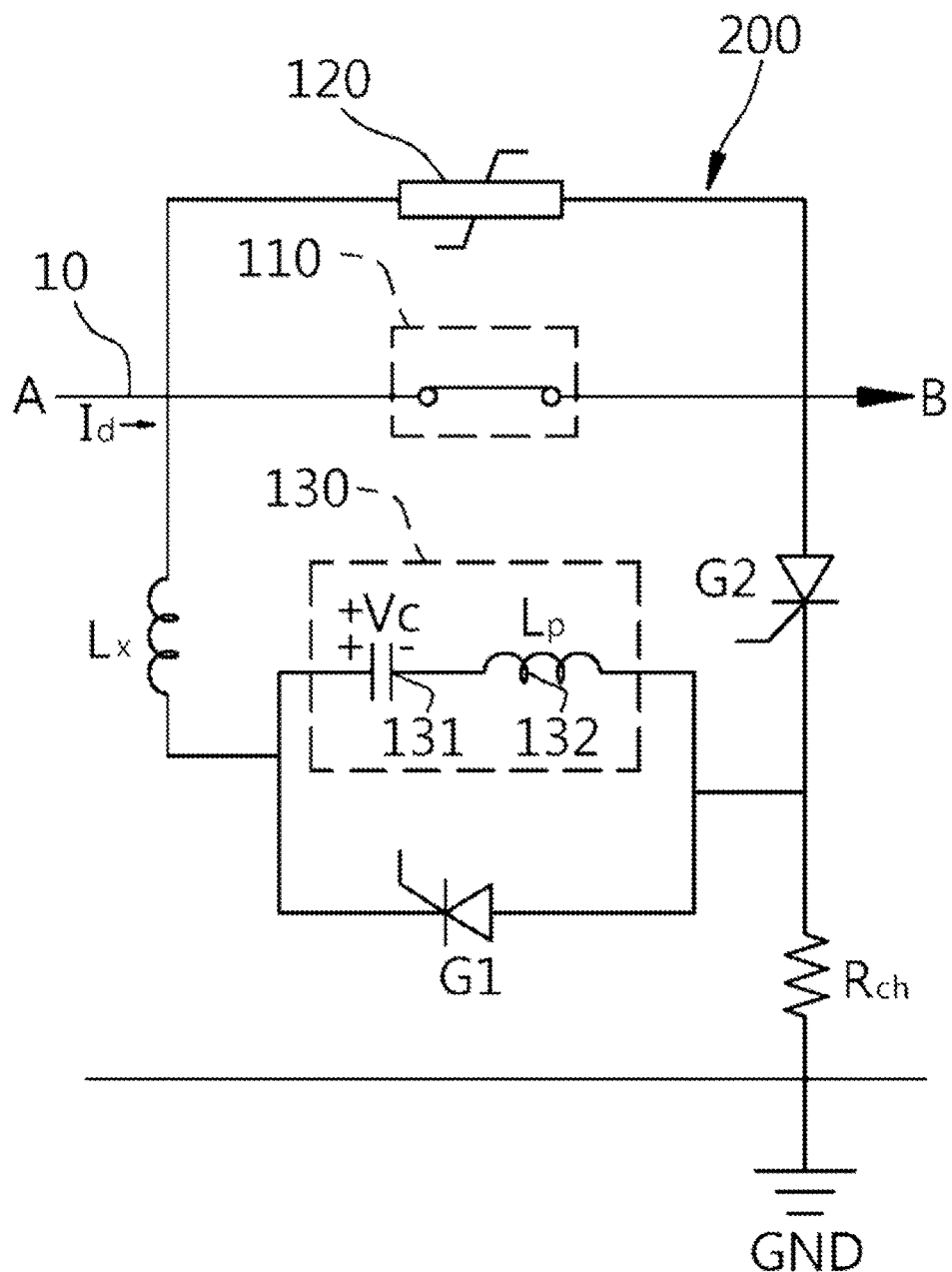
FIG. 4 is a circuit diagram showing the configuration of a high-voltage DC circuit breaker according to another embodiment of the present invention.

A high-voltage DC circuit breaker 200 according to another embodiment of the present invention is illustrated in FIG. 4.

FIG. 4 is a circuit diagram showing the configuration of a high-voltage DC circuit breaker according to another embodiment of the present invention. As shown in FIG. 4, the high-voltage DC circuit breaker 200 according to another embodiment of the present invention has the same configuration as the high-voltage DC circuit breaker 100 according to the above embodiment of the present invention, but there is only a difference in that, as shown in FIG. 4, the first switching element G1 and the second switching element G2 are connected to each other in a forward direction, and in that, when current flows in the direction from the second side to the first side of a DC line, that is, from side A to side B, respective anodes (to which no reference numeral is assigned) or respective cathodes (to which no reference numeral is assigned) of the first switching element G1 and the second switching element G2 are arranged in a reverse direction, which is the direction opposite the direction of flow of the current.

The arrangement of the first switching element G1 and the second switching element G2 in the reverse direction in the high-voltage DC circuit breaker 200 according to another embodiment of the present invention means that the anodes and cathodes are arranged in a direction opposite the direction of flow of steady state current Id when the high-voltage DC circuit breaker 200 is initially operated or when the steady state current Id flows from side A to side B along the DC line 10.

Because the first switching element G1 and the second switching element G2 are arranged in the reverse direction, the high-voltage DC circuit breaker 200 according to another embodiment of the present invention is different from the high-voltage DC circuit breaker 100 with respect to the operation of extinguishing an arc, and this will be described in detail below with reference to FIG. 5.

Figure 5:
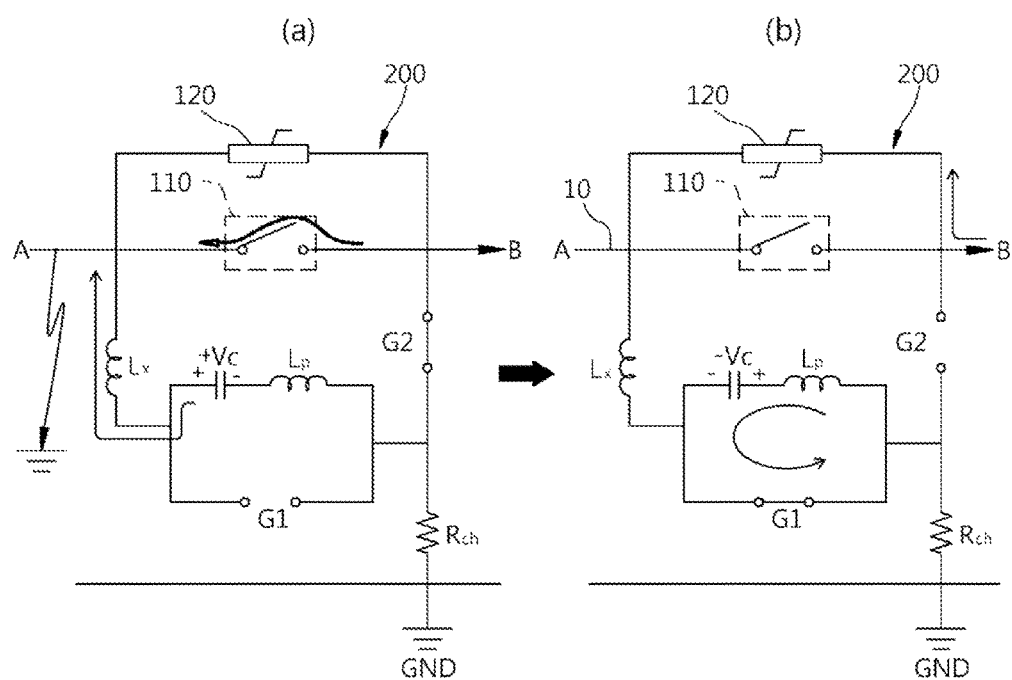
FIGS. 5(a) and 5(b) show equivalent circuit diagrams of first and second switching elements to illustrate the operating procedure of the high-voltage DC circuit breaker when a fault occurs on a second side of the high-voltage DC line shown in FIG. 4.

FIG. 5 is an equivalent circuit diagram of first and second switching elements to illustrate the operating procedure of the high-voltage DC circuit breaker when a fault occurs on the second side of the high-voltage DC line shown in FIG. 4. As shown in FIG. 5(a), when the main switch 110 is opened due to the occurrence of a fault on the second side (side A) of the DC line 10, an arc is formed. When the arc is formed in the main switch 110, the second switching element G2 is turned on in the state in which the first switching element G1 is turned off, as shown in FIG. 5(a). When the second switching element G2 is turned on, a current pulse, which is generated by the voltage (+Vc) stored in the capacitor 131 of the LC circuit 130 and is a DC component, is supplied to the main switch 110 in the direction of the second end of the main switch.

When the current pulse is supplied to the main switch 110, zero (0) current is realized in the main switch 110 using the supplied current pulse, and thus the arc formed in the main switch 110 is extinguished. Here, it is preferable that the current pulse supplied through side A has a direction opposite that of the fault current continuously flowing through the arc in the main switch 110, and has a magnitude greater than that of the fault current. For this, the charging capacity of the capacitor may be determined.

At the same time that the arc formed in the main switch 110 is extinguished, voltage (−Vc) is charged in the capacitor 131. After the voltage (−Vc) has been charged in the capacitor 131 and the arc formed in the main switch 110 has been extinguished, overvoltage generated on the first side (side B) of the DC line, which becomes higher than the voltage on the second side (side A) of the DC line, is consumed in the nonlinear resistor 120, as shown in FIG. 5(b), at the same time that the voltage (−Vc) charged in the capacitor 131 is charged as the voltage (+Vc), as shown in FIG. 5(b), via the resonance produced by the LC circuit 130 when the first switching element G1 is turned on in the state in which the second switching element G2 is turned off, and thereafter the first switching element G1 is turned off.

When the first switching element G1 is turned off, the high-voltage DC circuit breaker 200 according to the present invention performs an operation of reclosing the main switch 110. That is, when a closed circuit is formed by closing the main switch 110, the arc is extinguished by repeating the above procedures until the fault on the side A is repaired. Such reclosing is possible because the capacitor 131 of the LC circuit 130 is maintained in the state of being charged to the voltage (+Vc) after the arc in the main switch 110 is extinguished.

As described above, the high-voltage DC circuit breakers 100 and 200 according to the present invention block a fault current flowing through an arc formed in the main switch 110 by extinguishing the arc through LC resonance performed once in the LC circuit 130.

Figure 1:
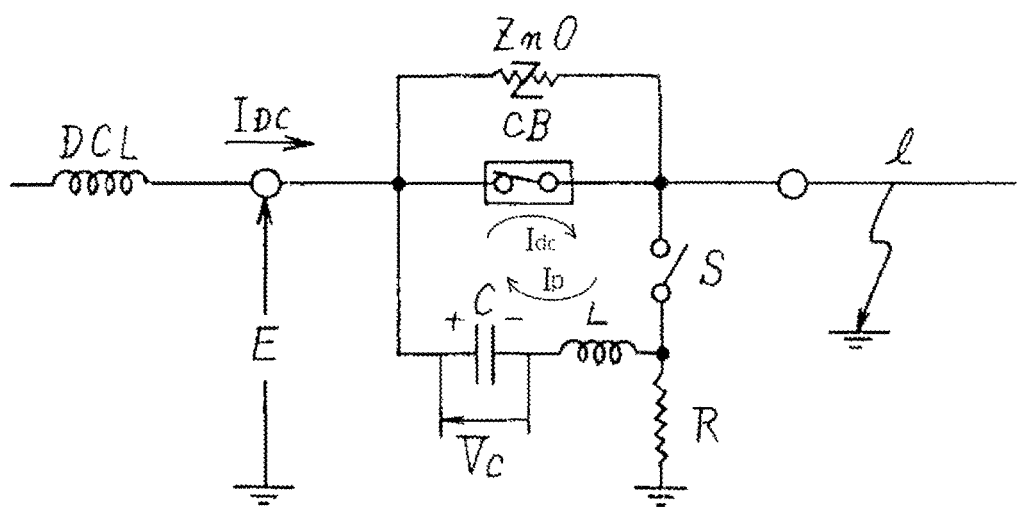
FIG. 1 is a circuit diagram showing a conventional high-voltage DC circuit breaker.

As described above, the high-voltage DC circuit breakers 100 and 200 according to the present invention are characterized in that current depending on LC resonance is generated via the first switching element G1 rather than via the main switch CB, as in the case of the conventional technology shown in FIG. 1. Therefore, unlike the conventional technology, in which current oscillation is increased by LC resonance, the present invention performs LC resonance only once so that the polarity of voltage in the capacitor 131 of the LC circuit 130 is reversed via LC resonance. This is the cause of the improved blocking speed compared to the conventional technology. Further, unlike the conventional technology, the present invention is intended to extinguish the arc by injecting current flowing in the direction opposite that of a fault current flowing through the main switch 110 into the main switch 110 using the voltage stored in the capacitor 131, and by generating zero current.

As described above, although the present invention has been described in detail with reference to preferred embodiments, it should be noted that the present invention is not limited to the description of these embodiments. It is apparent that those skilled in the art to which the present invention pertains can perform various changes or modifications of the present invention without departing from the scope of the accompanying claims and those changes or modifications belong to the technical scope of the present invention although they are not presented in detail in the embodiments. Accordingly, the technical scope of the present invention should be defined by the accompanying claims.

The invention claimed is:

1. A high-voltage DC circuit breaker for blocking current flowing through a DC line, comprising:
   a main switch connected to the DC line, and configured to be opened when a fault occurs on a first side or a second side of the DC line, thus blocking a current flowing through the DC line;
   an LC circuit connected in parallel with the main switch and provided with a capacitor and an inductor connected in series with each other to produce LC resonance;
   a first switching element connected in parallel with the LC circuit and configured to perform switching so that a positive voltage or a negative voltage stored in the capacitor via the resonance produced by the LC circuit is charged, with a polarity of the positive or the negative voltage changed; and
   a second switching element connected in series with the LC circuit, connected in parallel with the main switch and connected between the LC circuit and the DC line, the second switching element performing switching so that a current pulse, generated by the positive or negative voltage charged in the capacitor, is supplied to the main switch,
   wherein the first switching element and the second switching element are connected in a forward direction, are each arranged in a forward or reverse direction relative to a direction of current flowing from the second side to the first side of the DC line, and are each implemented using one or more power semiconductor switches,
   when the main switch is opened due to occurrence of a fault on the second side of the DC line, and an arc is formed when the main switch is opened, and the second switching element is turned on in a state in which the first switching element is turned off, so that the current pulse generated by the positive voltage stored in the capacitor of the LC circuit is supplied in a direction of a second end of the main switch, and zero current is realized in the main switch using the supplied current pulse, thus enabling the arc formed in the main switch to be extinguished, and enabling the negative voltage to be charged in the capacitor, wherein, after the arc formed in the main switch has been extinguished, the negative voltage charged in the capacitor is charged as the positive voltage via the resonance produced by the LC circuit when the first switching element is turned on in a state in which the second switching element is turned off, and thereafter the first switching element is turned off.

2. The high-voltage DC circuit breaker of claim 1, further comprising a charging resistor for charging the positive voltage in the capacitor during an initial operation, wherein the charging resistor is connected between the capacitor of the LC circuit and a ground so that the charging resistor is arranged in series with the LC circuit.

3. The high-voltage DC circuit breaker of claim 1, further comprising a nonlinear resistor connected in parallel with the main switch, wherein, after the arc formed in the main switch has been extinguished, overvoltage on the second side, which becomes higher than a voltage on the first side of the DC line, is consumed in the nonlinear resistor while the capacitor is recharged to the positive voltage using current flowing through the LC circuit, and then the second switching element is turned off.

* * * * *